(12) United States Patent
Pittel

(10) Patent No.: US 7,257,255 B2
(45) Date of Patent: Aug. 14, 2007

(54) CAPTURING HAND MOTION

(75) Inventor: Arkady Pittel, Brookline, MA (US)

(73) Assignee: CandleDragon, Inc., Brookline, MA (US)

( * ) Notice: Subject to any disclaimer, the term of this patent is extended or adjusted under 35 U.S.C. 154(b) by 1069 days.

(21) Appl. No.: 09/991,539

(22) Filed: Nov. 21, 2001

(65) Prior Publication Data

US 2003/0095708 A1 May 22, 2003

(51) Int. Cl.
*G06K 9/00* (2006.01)

(52) U.S. Cl. .................................... 382/187

(58) Field of Classification Search ........ 382/186–189, 382/313; 178/19.01, 19.05; 345/179
See application file for complete search history.

(56) References Cited

U.S. PATENT DOCUMENTS

| | | | |
|---|---|---|---|
| 3,376,551 A | 4/1968 | Armbruster |
| 3,559,307 A | 2/1971 | Barrekette et al. |
| 3,581,099 A | 5/1971 | Franke |
| 3,801,741 A | 4/1974 | Ablett |
| 3,915,015 A | 10/1975 | Crane et al. |
| 4,124,838 A | 11/1978 | Kiss |
| 4,131,880 A | 12/1978 | Siy et al. |
| 4,550,250 A | 10/1985 | Mueller et al. |
| 4,650,335 A | 3/1987 | Ito et al. |
| 4,682,016 A | 7/1987 | Inoue |
| 4,688,933 A | 8/1987 | Lapeyre |
| 4,705,942 A | 11/1987 | Budrikis et al. |
| 4,710,760 A | 12/1987 | Kasday |
| 4,751,741 A | 6/1988 | Mochinaga et al. |
| 4,782,328 A | 11/1988 | Denlinger |
| 4,806,707 A | 2/1989 | Landmeier |
| 4,883,926 A | 11/1989 | Baldwin |
| 4,891,474 A | 1/1990 | Kelly |
| 4,896,965 A | 1/1990 | Goff et al. |
| 4,936,683 A | 6/1990 | Purcell |
| 5,026,153 A | 6/1991 | Suzuki et al. |
| 5,053,757 A | 10/1991 | Meadows |
| 5,121,441 A | 6/1992 | Chefalas et al. |
| 5,166,668 A | 11/1992 | Aoyagi |
| 5,185,638 A | 2/1993 | Conzola et al. |
| 5,198,877 A | 3/1993 | Schulz |
| 5,215,397 A | 6/1993 | Taguchi et al. |
| 5,227,622 A | 7/1993 | Suzuki |
| 5,227,732 A | 7/1993 | Hong |
| 5,239,139 A | 8/1993 | Zuta |

(Continued)

FOREIGN PATENT DOCUMENTS

EP    0 202 468    11/1986

(Continued)

OTHER PUBLICATIONS

Conant, R., et al., "A Raster-Scanning Full-Motion Video Display Using Polysilicon Micromachined Mirrors", *Sensors and Actuators A: Physical*, 83(1):291-296, May 2000.
Craft, D.J., et al., "Accelerometer Pen", *IBM Technical Disclosure Bulletin*, 16(12):4070, May 1974.
Du, H., et al., "A Virtual Keyboard Based on True-3D Optical Ranging", *Proceedings of the British Machine Vision Conference*, Oxford, U.K., vol. 1, pp. 220-229, Sep. 2005.
Narayanaswamy, S., et al., "Using data on digital cellular and PCS voice networks", *Bell Labs Technical Journal*, 3(2):58-75, Apr. 1998.
Romano, B., "Microsoft's latest is flat-out impressive", *The Seattle Times*, 3 pages, Jul. 19, 2006.
Office Action from Japanese Patent Office.

*Primary Examiner*—Daniel Miriam
(74) *Attorney, Agent, or Firm*—Fish & Richardson P.C.

(57) ABSTRACT

A portable electronic device, a digital camera associated with the portable electronic device, and software configured to run on the portable electronic device and to derive handwriting and control information from hand motion of a writing instrument in the vicinity of the digital camera.

26 Claims, 7 Drawing Sheets

U.S. PATENT DOCUMENTS

Figure 1:
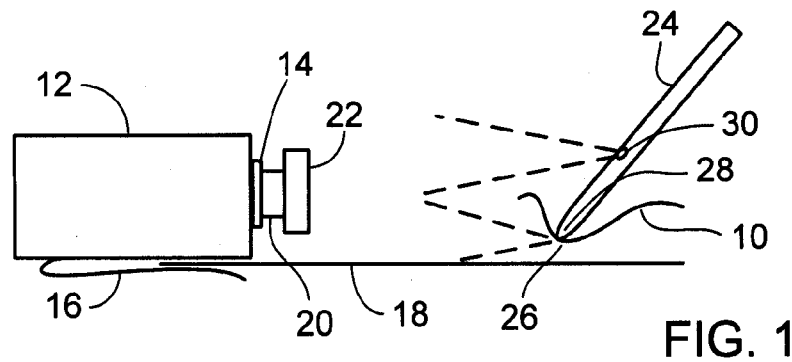

| | | |
|---|---|---|
| 5,247,137 A | 9/1993 | Epperson |
| 5,296,838 A | 3/1994 | Suzuki |
| 5,301,222 A | 4/1994 | Fujiwara |
| 5,308,936 A | 5/1994 | Biggs et al. |
| 5,313,542 A | 5/1994 | Castonguay |
| 5,317,140 A | 5/1994 | Dunthorn |
| 5,347,477 A | 9/1994 | Lee |
| 5,371,516 A | 12/1994 | Toyoda et al. |
| 5,434,371 A | 7/1995 | Brooks |
| 5,453,762 A | 9/1995 | Ito et al. |
| 5,483,261 A | 1/1996 | Yasutake |
| 5,517,579 A | 5/1996 | Baron et al. |
| 5,525,764 A | 6/1996 | Junkins et al. |
| 5,546,538 A | 8/1996 | Cobbley et al. |
| 5,548,092 A | 8/1996 | Shriver |
| 5,572,607 A | 11/1996 | Behrends |
| 5,587,558 A | 12/1996 | Matsushima |
| 5,612,720 A | 3/1997 | Ito et al. |
| 5,629,499 A | 5/1997 | Flickinger et al. |
| 5,652,412 A | 7/1997 | Lazzouni et al. |
| 5,661,761 A | 8/1997 | Iwamatsu |
| 5,793,361 A | 8/1998 | Kahn et al. |
| 5,805,719 A | 9/1998 | Pare, Jr. et al. |
| 5,818,424 A | 10/1998 | Korth |
| 5,825,921 A | 10/1998 | Dulong |
| 5,831,601 A | 11/1998 | Vogeley et al. |
| 5,874,947 A * | 2/1999 | Lin ............................ 345/169 |
| 5,900,943 A | 5/1999 | Owen |
| 5,902,968 A | 5/1999 | Sato et al. |
| 5,945,981 A | 8/1999 | Paull et al. |
| 5,963,194 A | 10/1999 | Umeda et al. |
| 5,996,956 A | 12/1999 | Shawver |
| 6,014,129 A | 1/2000 | Umeda et al. |
| 6,038,333 A * | 3/2000 | Wang ........................ 382/118 |
| 6,055,552 A | 4/2000 | Curry |
| 6,100,538 A | 8/2000 | Ogawa |
| 6,124,848 A | 9/2000 | Ballare et al. |
| 6,137,908 A | 10/2000 | Rhee |
| 6,181,329 B1 | 1/2001 | Stork et al. |
| 6,191,778 B1 | 2/2001 | Chery et al. |
| 6,236,753 B1 | 5/2001 | Inamoto |
| 6,243,165 B1 | 6/2001 | Norita et al. |
| 6,326,956 B1 | 12/2001 | Jaeger et al. |
| 6,333,716 B1 | 12/2001 | Pontoppidan |
| 6,335,727 B1 | 1/2002 | Morishita et al. |
| 6,348,914 B1 | 2/2002 | Tuli |
| 6,377,238 B1 | 4/2002 | McPheters |
| 6,392,821 B1 | 5/2002 | Benner, Jr. |
| 6,414,673 B1 | 7/2002 | Wood et al. |
| 6,441,362 B1 | 8/2002 | Ogawa |
| 6,490,563 B2 | 12/2002 | Hon et al. |
| 6,501,061 B1 | 12/2002 | Kitai et al. |
| 6,525,715 B2 * | 2/2003 | Uchiyama et al. ........... 345/169 |
| 6,526,351 B2 * | 2/2003 | Whitham ..................... 701/211 |
| 6,567,078 B2 * | 5/2003 | Ogawa ........................ 345/179 |
| 6,577,299 B1 | 6/2003 | Schiller et al. |
| 6,614,422 B1 | 9/2003 | Rafii et al. |
| 6,633,671 B2 * | 10/2003 | Munich et al. ............. 382/187 |
| 6,647,145 B1 | 11/2003 | Gay |
| 6,760,009 B2 | 7/2004 | Omura et al. |
| 6,811,264 B2 | 11/2004 | Raskar et al. |
| 6,856,349 B1 | 2/2005 | Trevino |
| 6,897,854 B2 | 5/2005 | Cho et al. |
| 7,006,134 B1 * | 2/2006 | Arai et al. ................. 348/222.1 |
| 7,054,045 B2 | 5/2006 | McPheters et al. |
| 7,091,959 B1 | 8/2006 | Clary |
| 2001/0030668 A1 | 10/2001 | Erten et al. |
| 2002/0031243 A1 | 3/2002 | Schiller et al. |
| 2002/0118181 A1 | 8/2002 | Sekendur |
| 2002/0163511 A1 * | 11/2002 | Sekendur ..................... 345/179 |
| 2003/0122804 A1 * | 7/2003 | Yamazaki et al. ........... 345/179 |
| 2005/0073508 A1 | 4/2005 | Pittel et al. |
| 2005/0128183 A1 | 6/2005 | McGreevy |
| 2005/0128184 A1 | 6/2005 | McGreevy |
| 2006/0077188 A1 | 4/2006 | Byun |
| 2006/0176287 A1 | 8/2006 | Pittel et al. |
| 2006/0176288 A1 | 8/2006 | Pittel et al. |

FOREIGN PATENT DOCUMENTS

| | | |
|---|---|---|
| EP | 0 717 368 | 6/1996 |
| EP | 0 865 192 | 9/1998 |
| EP | 0 869 690 | 10/1998 |
| FR | 2 650 904 | 2/1991 |
| JP | A S62-243022 | 10/1987 |
| JP | A H07-234105 | 9/1995 |
| JP | A H08-506193 | 7/1996 |
| JP | A H09-319501 | 12/1997 |
| JP | A H11-21925 | 1/1999 |
| JP | A H11-84227 | 3/1999 |
| JP | 2000-196326 | 7/2000 |
| WO | WO94/09447 | 4/1994 |
| WO | WO94/18663 | 8/1994 |
| WO | WO95/02163 | 1/1995 |
| WO | WO97/16799 | 5/1997 |
| WO | WO98/44316 | 10/1998 |
| WO | WO00/011596 | 3/2000 |
| WO | WO01/031570 | 5/2001 |
| WO | WO01/077796 | 10/2001 |
| WO | WO2005/058177 | 6/2005 |

\* cited by examiner

CAPTURING HAND MOTION

BACKGROUND

This invention relates to capturing hand motion.

Because hand motion is an instinctive and natural mode of human expression, electronic devices are often designed to capture hand motion as an indicator of information or commands that a user wishes to express. Handwriting motion, for example, can be captured on some personal digital assistants (PDAs) by writing on a touch sensitive display surface. Handwriting recognition software analyzes the motion to infer what has been written. A wide range of other input devices have been used to capture hand motion including track balls, mice, light pens, digitizing tablets, and electronic pens.

SUMMARY

In general, in one aspect, the invention features, apparatus that includes (a) a portable electronic device, (b) a digital camera associated with the portable electronic device, and (c) software configured to run on the portable electronic device and to derive handwriting and control information from hand motion of a writing instrument in the vicinity of the digital camera.

Implementations of the invention may include one or more of the following features. The portable electronic device includes a mobile telephone or a personal digital assistant. The digital camera is attached to the portable electronic device. The digital camera is incorporated in the portable electronic device. An infrared filter is arranged to filter light being received from the writing instrument. A lens is arranged to alter the focal length and/or depth of field of the digital camera. A mechanism is configured to enable the digital camera to be attached to a writing surface. The mechanism comprises a suction device configured for attachment to a white board or a clip configured to grasp paper. The portable electronic device includes a writing surface. The writing surface is on a protective cover. The software is configured to define a mapping between a sensor surface in the digital camera and a space in which the hand motion is occurring. The software is configured to define the mapping in response to calibration steps that include a user marking three locations in the space in which the hand motion is occurring. The software is configured to derive the location and trajectory of the hand motion. The apparatus of claim in which the software is configured to generate the handwriting and control information based on processing cycles each associated with one location of the writing instrument. The software is configured to discriminate light received from the writing instrument by locking onto a carrier frequency at which light from the writing instrument is modulated. The software is configured to determine a tilt of the writing instrument relative to a direction normal to a writing surface. The portable electronic device includes a display and the trajectory of the hand motion is shown on the display in real-time. The display is not touch-sensitive. The portable electronic device includes a digital signal processing chip and a general purpose microprocessor, and the software is run in part on the chip and in part on the microprocessor. The portable electronic device includes a wireless communication facility and the software is configured to communicate the handwriting and control information to a remote location. The digital camera is configured to receive light that has been reflected from the writing instrument. The digital camera comprises a still camera. The digital camera comprises a video-capable camera, an infrared beacon configured to be directed at the writing instrument. The software is configured to apply pattern recognition to signals from the digital camera.

In general, in another aspect, the invention features a method that includes (a) exposing a sensor of a digital camera to a writing instrument that is being subjected to hand motion, and (b) in a device associated with the digital camera, processing the data to infer handwriting and/or control information based on the hand motion.

Implementations of the invention may include one or more of the following features. The exposing of the sensor includes receiving light that originates from light sources on the writing instrument. The exposing of the sensor includes exposing the sensor to a trace or other marking left by the writing instrument.

Implementations of the invention may include one or more of the following features. The trace or other marking includes ink selected to increase a signal-to-noise ratio of light received by the sensor. The exposing of the sensor includes processing of an image of a tip of a writing instrument. The tip of the writing instrument is characterized by being of high contrast with the environment in which it is used. The sensor is exposed to hand motion occurring with respect to any arbitrary surface at any arbitrary angle. The digital camera is calibrated in a manner to permit correctly inferring linear hand motions. The processing of data is calibrated using information derived when the writing instrument is touched to at least two points on a writing surface. The digital camera is automatically switched from one format to another by coupling the camera, or a device to which it is connected, to another mechanism. A tilt and/or swivel position of the camera is adjustable for better coverage of a writing surface.

Other advantages and features will become apparent from the following description and from the claims.

DESCRIPTION

Figure 2:
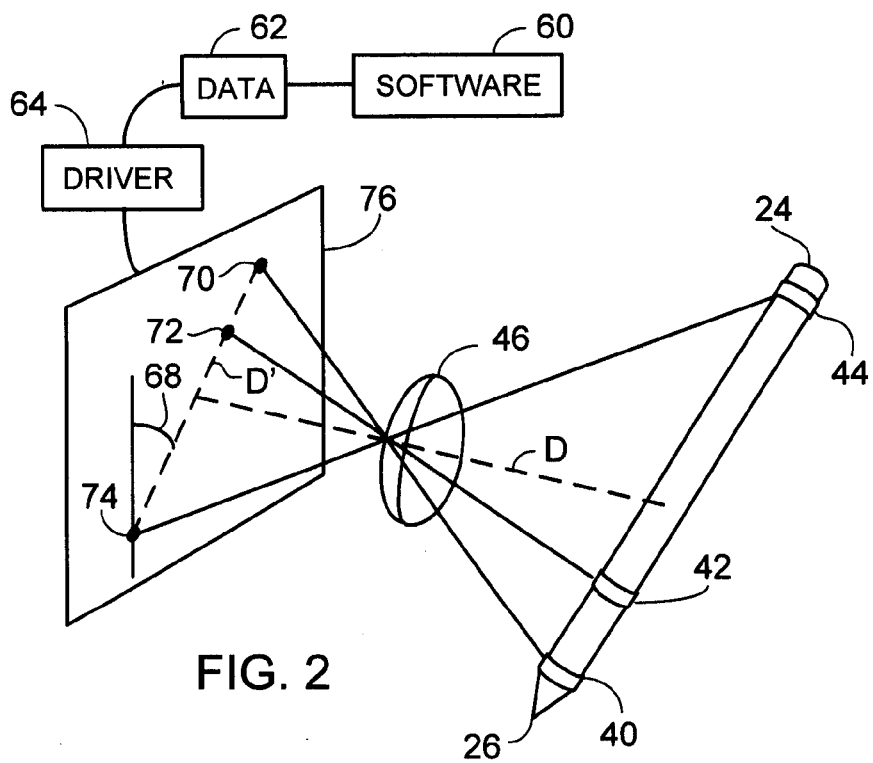
Figure 3:
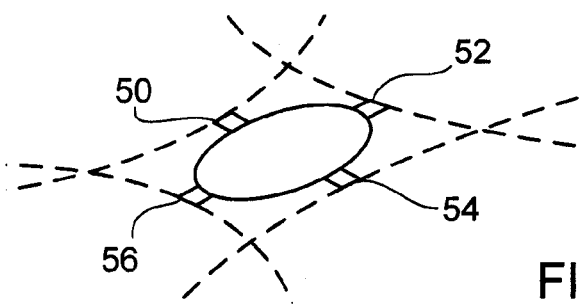
Figure 4:
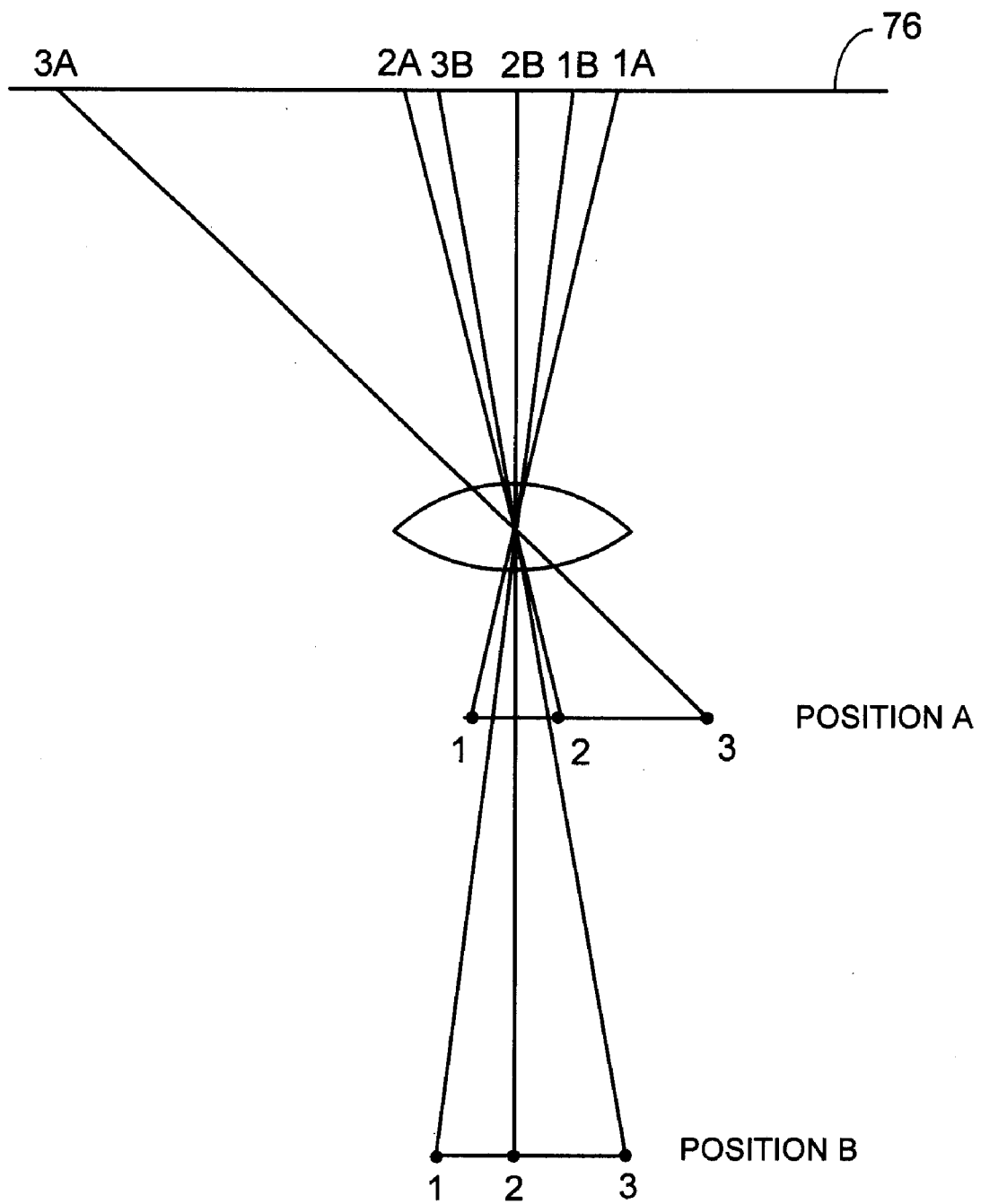
Figure 5:
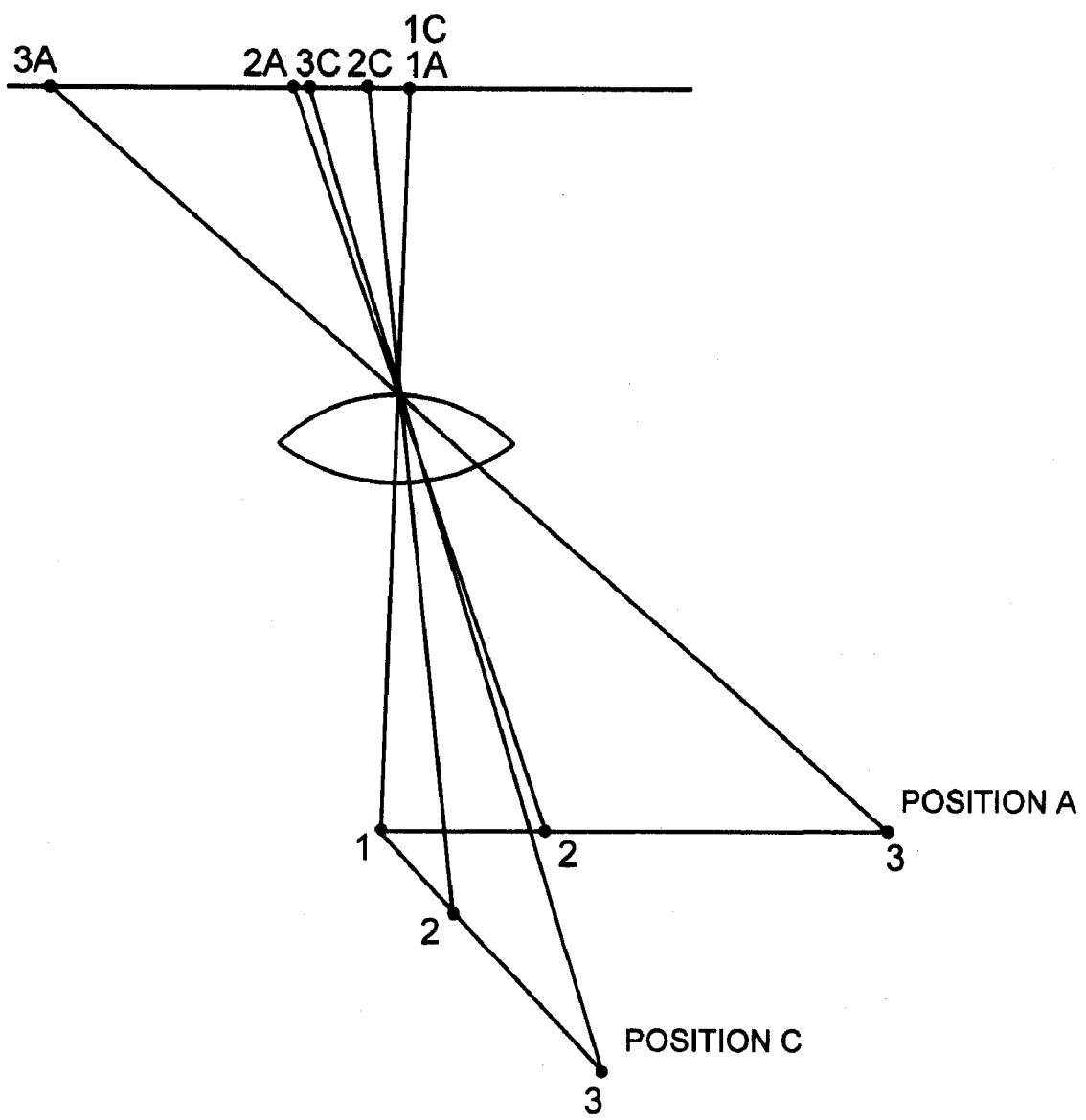
Figure 6:
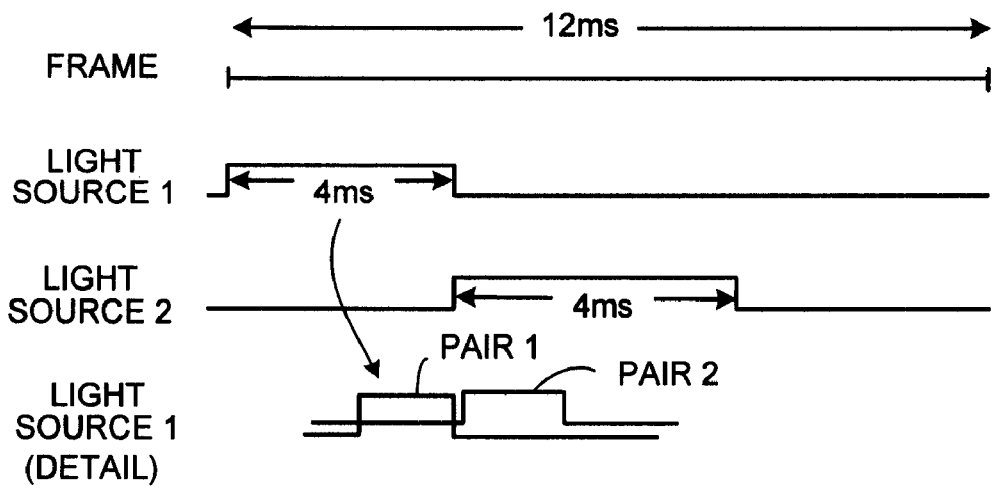
Figure 7:
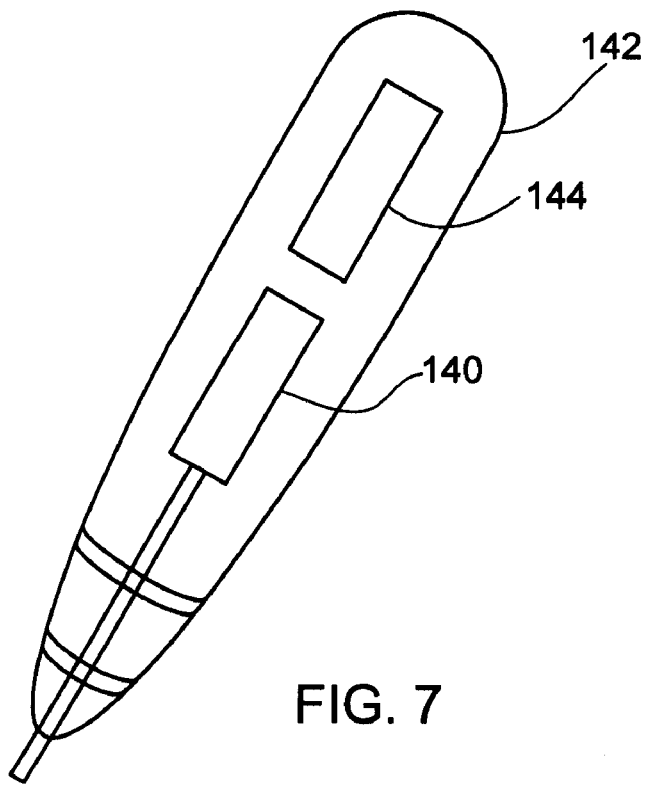
Figure 8:
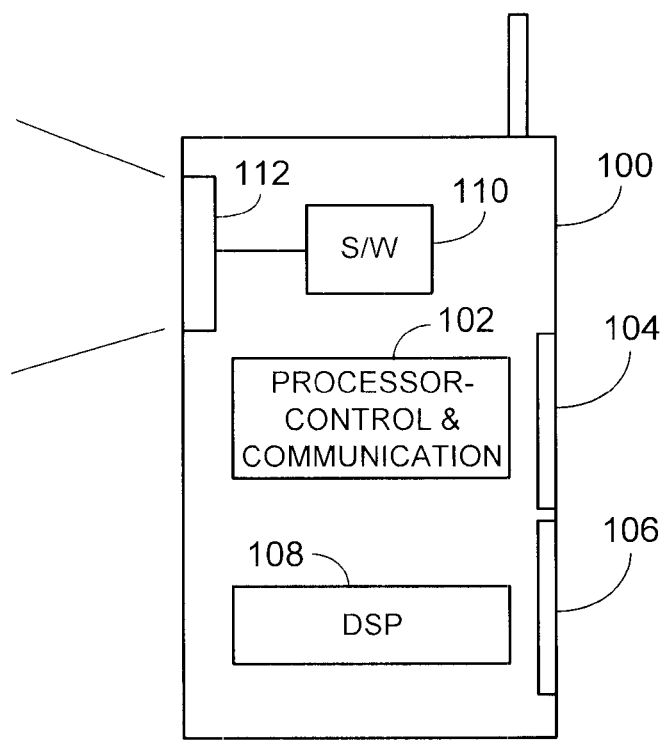
Figure 9:
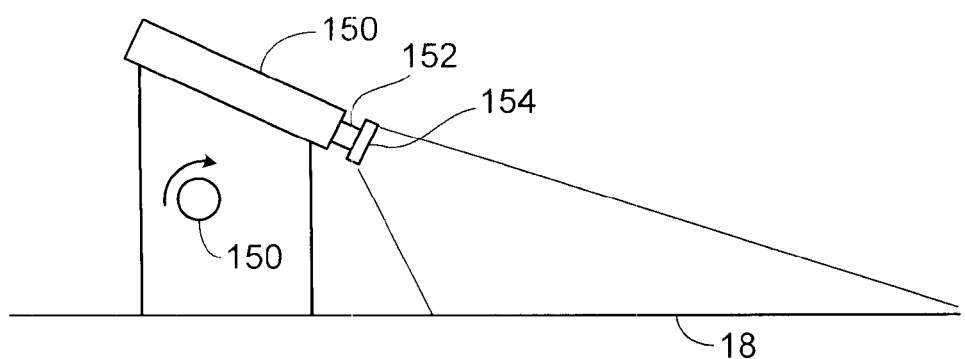
Figure 10:
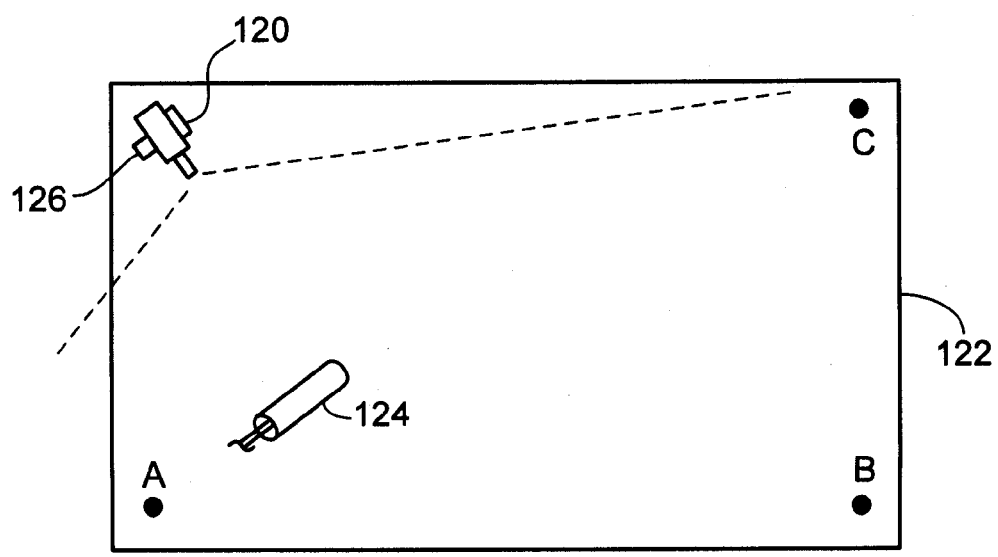
Figure 11:
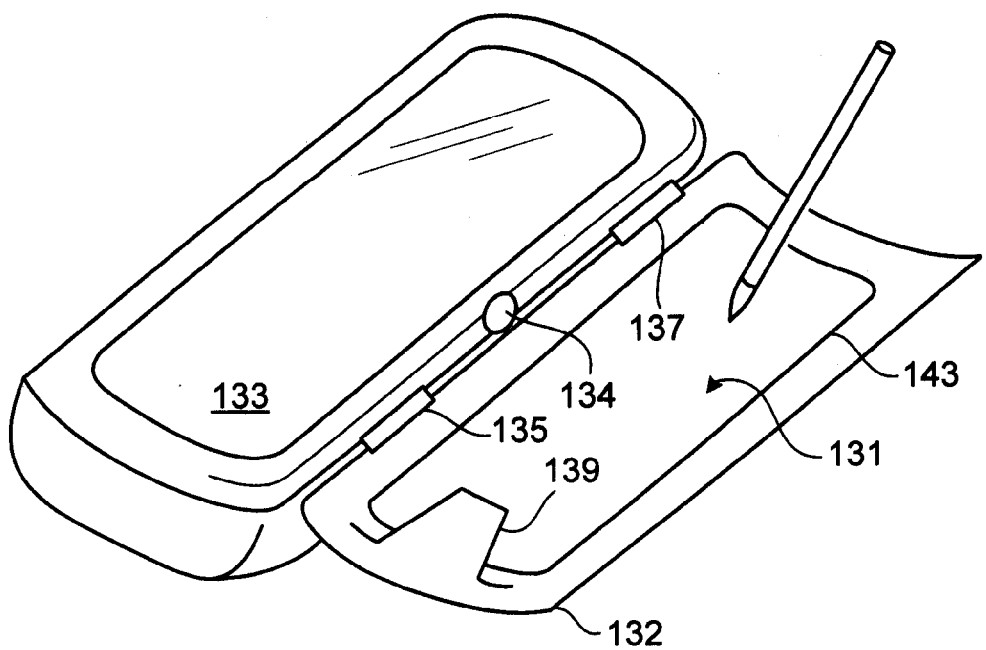
Figure 12:
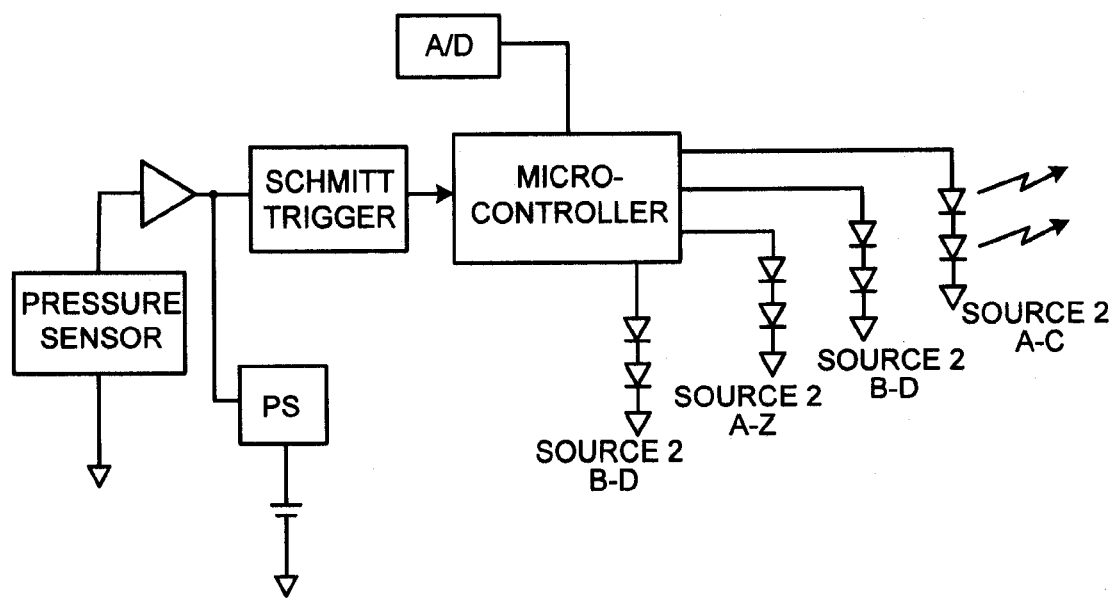

FIG. 1 shows a hand motion capture system.
FIG. 2 shows the hand motion capture facility.
FIG. 3 shows a lights source.
FIGS. 4 and 5 illustrate tilt and distance computations.
FIG. 6 is a timing diagram.
FIG. 7 shows a writing instrument.
FIG. 8 shows a mobile telephone.
FIG. 9 shows hand motion capture.
FIG. 10 shows a white board.
FIG. 11 shows a cellular phone.
FIG. 12 shows a circuit for a writing instrument.

Many portable devices, including cellular phones, PDAs, pen computers, and tablets, include small digital cameras that can capture still images or video sequences of images, enabling, for example, streaming video applications. A typical digital camera produces a focused image of a field of view on a sensor that captures the image and produces digital data representing the image.

A digital camera, including digital cameras that are incorporated into such portable devices, can be used to track the position of the tip of a writing instrument on a writing surface and process the tracked motion for storage and for further processing and communication of the hand motion or other handwriting. (When we use the word handwriting in this discussion, we mean to include any kind of meaningful hand motion, whether or not it can be considered handwriting. The hand motion can be associated with drawing or sketching or with cursor control, for example.)

While a streaming video capability may be used to track handwriting in process, a still camera can be used to capture images. The first approach has the advantages of using less memory and data for communication and achieving easier handwriting recognition compared to still capture that needs to process more data as bit maps versus vector graphics (in real-time tracing). A real time approach allows for tracking infrared (IR) light, which increases signal to noise ratio (S/N) and detection capabilities.

Tracking light (IR or visible or ultraviolet) is not the only way to increase S/N ratio. When using a passive (non light-emitting) writing instrument, special ink can be used or a black ink or tip on a white surface also improves the S/N ratio. The reflected light can be tracked by the camera.

Real time tracking is limited by the camera's frame rate. Fast handwriting recognition requires frame rates to be from 60 to 100 Hz. Typical cameras in consumer products have rates of 15 to 30 Hz, which would limit the speed of handwriting to be recorded. However, some cameras can be configured to capture only a portion of the sensor signals, which permits faster frame rates. That capability may be used for cameras of cell phones and other devices.

The writing instrument could be a pen, a stylus, a whiteboard marker, or any other object that can be held in the hand and used to indicate hand motion or handwriting. The writing surface could be paper or any other surface on which the hand motion or handwriting might occur. In some cases, the hand motion or handwriting could be performed in mid-air rather than on a surface.

Among the advantages of using such a digital camera to capture handwriting are the following. If the camera is already incorporated in a portable device, there is no need to integrate additional hardware into the portable device. In other instances, non-portable devices such as a desktop personal computer or a white board can be fitted with a digital camera to capture the handwriting. In general, any telephone or PDA can be fitted with the capability described here.

As shown in FIG. 1, a camera-enabled portable device can be used with a pen and paper for capturing handwriting. In FIG. 1, a cellular phone 12 includes or is fitted with a digital camera 14 and a clip 16 to grasp a piece of paper or pad 18. An optional lens 20 and filter 22 may be attached to the camera as explained later. The pen 24 has a tip 26 that releases ink onto the page in the usual way as the user writes. Light sources 28, 30 (e.g., LEDs) are arranged on the shaft of the pen.

Each of the light sources emits light (e.g., infra-red light) in a range of directions. Using IR light sources on the pen enhances the signal-to-noise ratio of the signals of interest compared to the background that are generated by the camera as the pen is used for handwriting. Other implementations might use conventional writing instruments that had no light sources. The writing instrument could have reflectors or a colored markings. A conventional black tipped marker might be tracked on a white board without the need for light sources on the marker.

In other implementations, the portable device or the camera could include an IR beacon that would be reflected back to the camera by a passive writing instrument.

Calibration

As the camera is an optical device and is not designed to reproduce straight lines but rather images, calibration has to be performed during assembly and test of the product. A number of calibration points will be established within the area of intended use of the camera (the area may be any of a variety of different sizes). The calibration points are recalculated into calibration parameters for later use in correcting handwriting for linearity.

One challenge for implementations that are based on reflection is that other surfaces in the vicinity of the writing instrument also may be reflective, such as a ring on the finger of the user. By using image recognition capabilities of software associated with the camera, it would be possible to discriminate the writing instrument tip from other objects in the environment.

When light sources are used on the writing instrument, more than two light sources can be fitted, as shown in FIG. 2. The pen in FIG. 2 has three sources 40, 42, 44 that are placed along the length of the writing instrument to permit resolving the tilt orientation of the writing instrument relative to vertical and the X-Y position (and in some cases the Z position) of the writing instrument relative to the writing plane.

As shown in FIG. 3, each of the light sources includes a set of individual light sources (that could be LEDs) 50, 52, 54, 56 arranged on a circumference of the writing instrument. The LEDs' fields of view (FOV), shown in dashed lines, overlap so that light from the light source is detectable from any position around the writing instrument. A battery powered circuit in the writing instrument powers and controls the LEDs so that they all emit light at the same time or in a sequence.

Light from each light source 40, 42, 44, is received through a lens 46 and projected onto a corresponding point 70, 72, 74 on the surface of the camera sensor 76. The distance (e.g., distance D') between any two of the points 70, 72, 74 on the sensor surface is inversely proportional to the distance D from the sensor to the writing instrument. The distance D' can be determined by software 60 using the stored data 62 that is passed by the driver circuit 64 from the sensor.

The angle 68 of the line D' connecting the points 70, 72, 74 represents the vertical position of the writing instrument projected above the writing surface. The angle 68 can also be determined by the software from the stored data.

The location of point 70 on the sensor, representing the tip 26 of the writing instrument, will move two-dimensionally as the writing instrument is used for handwriting and its tip traverses a two dimensional path on the writing surface.

Distributing the light sources along the length of the pen enables reduced tilt error and better background interference cancellation. Substantial separation of the light sources along the length of the writing instrument provides additional information for determining the distance of the writing instrument from the sensor surface As shown in FIG. 4, the distances between any pair of the light sources is projected onto the sensor as a corresponding distance between the projection points. The distances on the sensor between points 1 and 2 and between points 2 and 3 and their ratio determine the distance from the pen to the sensor. The shorter are those lines, the greater is the distance to the writing instrument. A change of the ratio between those lines implies which direction the pen is tilted relative to the orientation (at position A) in which the pen is parallel to the surface of sensor plane and parallel to the writing surface When the line of tilt lies on a plane that is parallel to the sensor plane, as in FIG. 4 (looking from above), the ratio of the ratio of the lines on the sensor 3A-2A/2A-1A to 3B-2B/2B-1B are the same but their absolute values are exactly proportional to the distance to the writing instrument.

When the plane on which the writing instrument is tilted is not parallel to the sensor, as shown in FIG. 5 (also looking from above), in which the pen is tilted parallel to the sensor in position A but at an angle α to sensor plane in position C, the ratio of the ratio of distances 3A-2A/2A-1A to the ratio of distances 3C-2C/2C-1C is proportional to angle α.

One advantage of using more than two light sources is to prevent loss of signal when objects (for example a finger) obstruct the line of sight. In such a case, the unobstructed light sources will still help to resolve the position of the tip of the writing instrument. The resolution of the tracking will be compromised, but the tracking of the general location of pen and its movements can be maintained.

(The light sources need not be LEDs but could be fiber optical or other light emitting devices.)

The LEDs at each of the light sources on the writing instrument can be triggered all at the same time or in pairs (the LEDs of each pair being ones that are located on opposite sides of the writing instrument.) Because the spatial shift between LEDs in a single light source should be minimized, it is desirable to light all four of the LEDs for a given light source together. The beams of the respective LEDs have to overlap to create a light source for the sensor. However, electronics in the writing instrument may restrict how many LEDs can be lit at one same time, especially in the case of the limited power and voltage of a portable pen.

For that reason, it may be useful to light only opposing pairs of the LEDs at one time. Because CMOS sensors integrate the received light, and the time separation between the triggering of the respective pairs is miniscule, the sensor will not determine that the lights are spatially and time-wise separated.

FIG. 6 illustrates the simple case in which there are only two light sources at two locations along the length of the writing instrument, and each of the light sources has four LEDs.

The sensor and related software operate in successive capture cycles. In each of the capture cycles, the software determines an X-Y position of the tip of the writing instrument. The sequence of firing of different lights can also be used to encode information on the biometrics of the handwriting, such as pressure, and also differentiate the use of different writing instruments, such as different color pencils and markers and "erasers" (for example, in the case of a white board application) or for graphical designers. In such cases, more than three light sources might be used in combination to encode $2^n$ functions, where n is the number of light sources. If a PLL is used, other parameters can be used including frequency and time stamps or divisions.

Within each capture cycle, there are three stages, each lasting 4 msec for a total of 12 msec per capture cycle, corresponding to an 80 Hz frame rate. Other frame rates and stage times can be used in other applications and for other rates of handwriting. As shown in FIG. 6, in the first stage, the first light source is operated. In the second stage, the second light source is operated. In the third stage, both light sources are off and the background light is captured.

To increase the frame rate of the camera, partial frames can be captured (by using only a section of the sensor). Because the writing instruments are not moving as fast as the frame rate, an assumption can be made that the next light spot is near the previous one, i.e., that a line is being drawn, and increments of X and Y coordinates are not large. If the writing instrument light sources "disappear" the software can infer that the writing instrument is off the writing surface and can be located anywhere. For that reason, a full frame should be captured again after light spot has been detected. While the writing instrument is "off", the software is looking for light spots of high intensity. If they are found, the software processes them for high precision positioning with subpixel resolution. The number of bright light spots and their separation (ratio of distances between different light spots) within a certain window depending on tilt offers a way to prevent capture and to cancel background interference and noise. The approach would be to maintain a certain pattern of the ratio of distances (+/− due to tilt). Light spots that do not fit the pattern are considered as interference and excluded. This same pattern recognition technique is useful with systems of the kind that track hand motion of a writing instrument discussed in U.S. patent application Ser. Nos. 09/376,837 and 09/698,471, filed Aug. 18, 1999, and Oct. 27, 2000, and incorporated by reference in their entirety.

During each of the three 4 msec stages, the operated light sources are driven by a 10 kHz modulating frequency. Each half of the on cycles of 10 kHz is divided in half. During one-half, one pair of the LEDs is illuminated; and during the next one-half, the other pair is illuminated. To summarize, then, first one LED pair of one light source is lit, then the other pair of that source, this sequence repeats for the first stage illuminating the first light source. Then such sequence of illuminating pairs of LEDs repeats with another light source.

In the case of three light sources, another stage of 4 msec would be added to produce a frame or cycle period of 16 msec, and the frame rate will be approximately 66 Hz.

This same approach of using two light sources and illuminating them in sequence can be used in the triangulation system based on two sensors that is described in U.S. patent application Ser. Nos. 09/376,837 and 09/698,471, filed Aug. 18, 1999, and Oct. 27, 2000, and incorporated by reference in their entirety.

Phase lock loop circuitry coupled to the sensor locks on to the 10 kHz modulation carrier and its phase to detect when the light sources are on. As a result, only three stages are required within one frame for background cancellation. In other words, the sensor acquisition is synchronized with the writing instrument by locking onto the modulation frequency.

The construction of the writing instrument is similar to the writing instrument described in U.S. patent application Ser. Nos. 09/376,837 and 09/698,471, filed Aug. 18, 1999, and Oct. 27, 2000, incorporated by reference.

As shown in FIG. 7, the battery 140 is positioned in the middle of the writing instrument 142. All electronics: LEDs, pressure switch, a controller, and contacts for the battery are mounted on the back of a single flex board 144.

A circuit for the writing instrument is shown in FIG. 12. Different light sources comprising LEDs and their pairs are shown. The pressure sensor signal is processed for two outputs: one to start the circuitry and power supply and the other to digitize pressure for signature verifications and thickness of the line.

FIG. 8 shows a mobile phone 100. Processor 102 does housekeeping, including managing the control buttons 104 and LCD display 106, while the DSP 108 processes audio, video and wireless communication algorithms. The imaging software 110 reads data from the sensor 112 of the camera and provides the digital signal processor (DSP) with digital data. The camera sensor and the imaging software can be on one chip.

When the camera is a part of a cell phone, a PLL (phase lock loop) would require extra hardware in the cellular phone. Instead a software algorithm can be used that relies on three frames and subtracts one from the other and then adds their absolute values.

Such an algorithm is set forth in U.S. patent application Ser. No. 09/698,471, filed Oct. 27, 2000 and incorporated by reference.

The tilt-sensing approach based on light sources that are spaced along the length of the writing instrument can also be applied to systems in which the sensing of handwriting motion is done by triangulation from two sensors.

As shown in FIG. 9, the portable device 150 with the camera 152 is positioned with the camera facing the writing surface 12, and the whole writing surface is within its field of view (FOV). An extra lens-filter 154 may be required for such an application to increase the FOV as a regular camera is not designed for near focus applications. The extra lens can provide a shallow field of focus so that only the writing surface and writing instrument are in focus.

The lens-IR filter can be carried as a separate item and attached to the camera on the mobile phone when it is to be used for handwriting capture. Or the lens-filter can be a part of a clip for the phone. The clip can be designed so when the cell phone is inside the clip its camera is looking through the lens-filter on the clip. When you take the camera out from the clip, the camera sees in regular light. Switching from one mode to the other can be done automatically.

Different clips can be provided to mount the mobile phone on paper, white board, etc. The clips could have different designs, have different swivel and tilt arrangements, and be automatically recognized when a phone is plugged into them.

The IR filter maybe required to filter out sunlight and other sources of IR interference. The mobile phone camera can be positioned and focused using a clip with special tilting mechanism (to tilt it down the page for better view). The clip can be designed for multiple uses: to clip it to the belt like a regular clip or to the paper when it will be focused. The clip should also have a mechanism for tilting and rotating to focus the camera appropriately on the writing surface. (A tilting mechanism 158 is shown in FIG. 9.)

A portable device with its camera can be used on any surface, not only on a conventional writing surface. When the surface is large, for example a white board or a wall, the software that analyzes the sensor-captured data can be configured and calibrated to handle the larger scale. When the scale is larger, the center position on the sensor surface would be interpreted as located at a different (greater) distance from the writing instrument. The array of locations on the sensor would be mapped to a larger writing area. The resolution of the captured data, of course, suffers. For large scale handwriting capture from a large surface such as a white board, the writing instrument would be replaced with a special marker. The black (or other colored) tip of the marker would then automatically be tracked by the same phone and camera. No other special tracking equipment would be required.

FIG. 10 illustrates the use of a white board. As shown in FIG. 8, a cellular phone 120 can be used on any size board 122. The sensor and its related software can be calibrated by placing the phone into the calibration mode and pressing the marker 124 at three conrers, A, B and C. If the marker is one that has been fitted with light sources, the marker could have a pressure sensitive tip that causes the marker to emit light when it is pressed onto the board at each of the three conrers.

This enables the sensor software to determine the size and orientation of the white board. After calibration, the cellular phone is ready to accept data from the marker. An erasing function can be implemented by using a special marker that is fitted with LEDs and a control method for triggering the LEDs that uses a different (from the one normally used for data capture) spatial, time, or frequency separation between light sources or pairs of LEDs within the same light source. When the different pattern is invoked, the software in the cellular phone determines that the marker is being used in an erasing mode.

The same technique can be used to implement different colors of writing instruments and biometrics of handwriting.

The phone is attached to the board using a suction cup, a clip or some other mechanism 126 or can be integrated into the white board structure or the writing surface.

When the phone or PDA is equipped with a display, an image of the writing surface and the trajectory of the writing instrument could be shown on the display. In addition to enabling the user to see the results of his handwriting, this would enable the user to determine when the orientation and location of the camera is suitable to effectively capture the handwriting motion.

A writing surface may not be necessary at all. The user may write in mid-air.

As shown in FIG. 11, non-conventional writing surfaces may be used, including the inner surface 131 of a flipping cover 132 that protects the display 133 of the portable device when it is not being used.

FIG. 11 shows that the portable device could have two triangulating sensors 135, 137, such as the ones discussed in U.S. patent application Ser. Nos. 09/376,837 and 09/698,471, filed Aug. 18, 1999, and Oct. 27, 2000, and incorporated by reference. And a camera 134 can be provided.

As explained earlier, cursive text or drawings appear on LCD display 133 in real time, and text can be immediately or later be converted to ASCII using a software handwriting recognition algorithm. Thus, the display itself need not have a touch-sensitive surface for entering data. Instead the separate writing surface on the portable device can be used for that purpose. The cover could have a clip 139 for a piece of paper 143 so that the user could produce a paper copy of whatever he is entering into the portable device.

The separate writing surface could also be used for cursor control and navigation on the display, like a mouse or trackball.

The same approach can be used on "pen" computers, writing tablets, and tablet PC's to eliminate the need and cost for tracking directly on the LCD display. For redundancy, sensors can be used in all four conrers of display or more.

Single row arrays can be used for the same purpose on tablet PCs or other devices to track stylus on display.

When the user is about to begin using the handwriting capture feature, the camera may first be focused using a regular camera mode to view the page and then clipped to the writing surface so it does not move. Then the phone can be switched into a handwriting capture mode where instead of capturing an image, the sensor and the related software track the light source(s) from the pen.

As mentioned earlier, the writing surface is mapped by the software onto the sensor so that each coordinate on the writing surface has a corresponding subpixel location on the sensor. If the resolution of a camera is not high enough to provide pixel-by-pixel capturing, algorithms of the kind described in U.S. patent application Ser. No. 09/698,471, filed Oct. 27, 2000, and incorporated by reference, can be used to resolve pen position with sub-pixel accuracy.

During handwriting capture, each captured frame is processed to find peaks of light intensity, and only those points are processed for calculation of coordinates on paper.

When frames from the 2-D sensor are captured, the data is processed to find bright spots having intensity higher than a certain threshold. Then their position is processed to eliminate interference by separation of light sources (as discussed earlier). Invalid frames are thrown away. Then invalid light spots are thrown away in valid frames. If valid frames and subsequent light spots are found, each valid frame is processed for subpixel positions. Windows are established in vertical dimension to average the values of light intensity around the brightest spots. Window size (number of lines up and down for averaging) is a function of the previous position of the writing instrument but in most cases can be approximated. One approach is to use +/−16 lines in the sensor. After the appropriate lines are averaged, the resultant pixel array (pseudo linear array) is then processed using the algorithm described in the previous patent.

When tracing a passive writing instrument by looking at the ink or pen tip (black on white) we look for "different intensity" rather than "brightness".

The coordinates that represent handwriting, or traces of the writing instrument on the writing surface, can be displayed on the display of the portable or other device that is performing the tracking and can be simultaneously in real time or later on translated into ASCII. Either format, raw cursive or drawing motion, or handwriting that has already been converted to ASCII, can be stored in memory of the device and/or transmitted to other devices. Other processing of data, such as language translation, may be done on the capturing device or later on using a personal computer or server to which the data has been uploaded. Additional information about uploading and further processing is found in U.S. patent application Ser. No. 09/832,340, filed on Apr. 10, 2001, and incorporated by reference in its entirety.

The software for capturing and processing handwriting motion can be written using application development platforms provided by vendors such as OMAP by Texas Instrument and PCA by Intel.

One advantage of OMAP or PCA is that a third party designs its application using a higher level language like C or C++. When that software is compiled, the compiler separates computationally intensive calculations to be run on a digital signal processing (DSP) chip on the portable device from control functions to be run on the general purpose processor. Both OMAP and PCA are dual core processors.

Other implementations are within the scope of the following claims.

The invention claimed is:

1. Apparatus comprising
a portable electronic device comprising
a digital camera, and
a processor configured to derive handwriting or control information based on hand motion of a writing instrument from infared light received by the digital camera directly from the writing instrument when the writing instrument is used on a writing surface, the writing instrument and writing surface being separate from the apparatus.

2. The apparatus of claim 1 in which the portable electronic device comprises a mobile telephone or a personal digital assistant.

3. The apparatus of claim 1 also including an infrared filter arranged to filter light being received from the writing instrument.

4. The apparatus of claim 1 also including a lens arranged to alter the focal length and/or depth of field of the digital camera.

5. The apparatus of claim 1 also including a mechanism configured to enable the portable electronic device to be attached to a writing surface.

6. The apparatus of claim 5 in which the mechanism comprises a suction device configured for attachment to a white board.

7. The apparatus of claim 5 in which the mechanism comprises a clip configured to grasp paper.

8. The apparatus of claim 1 also comprising a writing surface.

9. The apparatus of claim 8 in which the writing surface is on a protective cover.

10. The apparatus of claim 1 in which the processor is configured to define a mapping between a sensor surface in the digital camera and a space in which the writing instrument is located.

11. The apparatus of claim 1 in which the processor is configured to define the mapping in response to calibration steps that include a user marking three locations in the space in which the writing instrument is located.

12. The apparatus of claim 1 in which the processor is configured to derive the location and trajectory of the writing instrument.

13. The apparatus of claim 1 in which the processor is configured to generate the handwriting and control information based on processing cycles each associated with one location of the writing instrument.

14. The apparatus of claim 1 in which the processor is configured to discriminate light received from the writing instrument from other light by locking onto a carrier frequency at which light from writing instrument is modulated.

15. The apparatus of claim 1 in which the processor is configured to determine a tilt of the writing instrument relative to a direction normal to a writing surface.

16. The apparatus of claim 1 in which the portable electronic device also comprises a display, and in which the processor is configured to cause the display to show the trajectory of the writing instrument in real-time.

17. The apparatus of claim 16 in which the display is not touch-sensitive.

18. The apparatus of claim 1 in which the processor comprises a digital signal processing chip and a general purpose microprocessor and software is run in part on the chip and in part on the microprocessor.

19. The apparatus of claim 1 in which the portable electronic device also comprises a wireless communication facility and in which the processor is configured to communicate the handwriting or control information to a remote location.

20. The apparatus of claim 1 in which the digital camera is configured to receive light that has been reflected from the writing instrument.

21. The apparatus of claim 1 in which the digital camera comprises a still camera.

22. The apparatus of claim 1 in which the digital camera comprises a video camera.

23. The apparatus of claim 1 also including an infra-red beacon configured to be directed at the writing instrument.

24. The apparatus of claim 1 in which the processor is configured to apply pattern recognition to signals from the digital camera.

25. A method comprising
in a portable electronic device comprising a digital camera and a processor,
receiving images at the digital camera comprising infared light received directly from a writing instrument being used on a writing surface, the writing instrument and writing surface being separate from the device, and
deriving handwriting and control information based on hand motion of the writing instrument, from the images.

26. Apparatus comprising
a portable electronic device comprising
a digital camera, and
a processor configured to
derive handwriting or control information based on hand motion of a writing instrument from light received by the digital camera directly from the writing instrument when the writing instrument is used on a writing surface, the writing instrument and the writing surface being separate from the apparatus, and
define a mapping between a sensor surface in the digital camera and a in response to calibration steps that include a user marking three locations on the writing surface.

* * * * *